Figure 1:
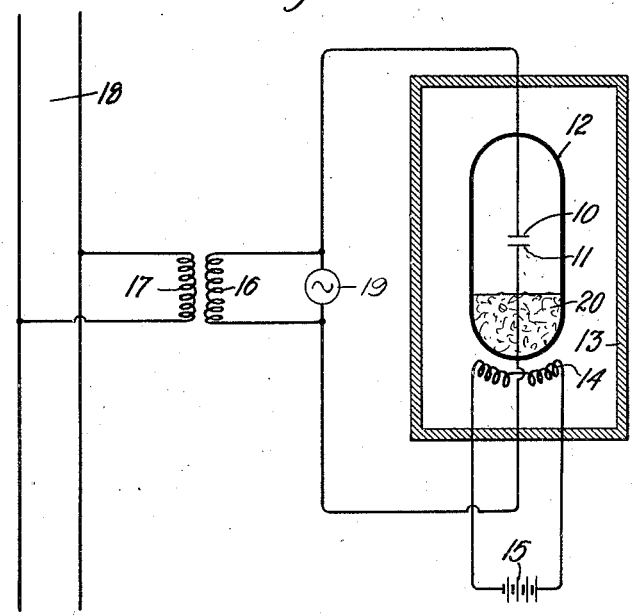

June 12, 1928.

H. C. SNOOK

PROTECTIVE DEVICE

Filed Oct. 31, 1923

1,672,993

Inventor:
Homer C. Snook,
by E.W. Adams, Atty

Patented June 12, 1928.

1,672,993

UNITED STATES PATENT OFFICE.

HOMER C. SNOOK, OF SOUTH ORANGE, NEW JERSEY, ASSIGNOR TO WESTERN ELECTRIC COMPANY, INCORPORATED, OF NEW YORK, N. Y., A CORPORATION OF NEW YORK.

PROTECTIVE DEVICE.

Application filed October 31, 1923. Serial No. 671,948.

This invention relates to protective devices for electrical apparatus and has for its object the removal of excessive voltages from the circuits of electrical apparatus.

This object is accomplished by utilizing the characteristic of an ionized discharge between two electrodes that for a short period of time after the discharge, the potential required to establish current flow between the electrodes is greatly below that normally required. Thus, a two-electrode vacuum tube containing an ionized vapor is connected in circuit with the opposite poles of a generator of alternating current and a circuit in shunt to the generator is inductively connected with the circuit to be protected. Potentials are recurrently impressed upon the electrodes of the tube of sufficient strength to break down the impedance between the electrodes and establish a discharge, thus, resulting in a short period of low impedance between the electrodes directly after each discharge. Excessive voltages applied to the circuit to be protected are shunted out through the protective device during these periods of low impedance.

Referring now to the drawings, the single figure thereof discloses diagrammatically an embodiment of the invention.

A pair of electrodes 10 and 11 are supported within the evacuated vessel 12 by leading-in wires sealed in the wall of the vessel. Surrounding the vessel is an oven 13 which is provided with a heater 14 supplied with heating current from the battery 15. Electrodes 10 and 11 are connected to the terminals of the secondary 16 of the transformer, the primary 17 of which is connected to the circuit 18 to be protected. The ratio of turns of the primary 17 to the secondary 16 of the transformer is such that it acts to step up voltages from circuit 18 to the tube circuit. A source 19 of high frequency alternating current is connected to electrodes 10 and 11 through the leading-in wires therefor, the secondary 16 of the transformer being shunted around the generator.

By means of the generator, alternating potentials are recurrently impressed between the electrodes 10 and 11 of sufficient intensity to break down the impedance thereof and establish an ionized discharge. For a short period of time after each discharge has stopped, the potential required to reestablish current flow between the electrodes 10 and 11 is greatly lowered but builds up quickly to its normal value. This condition is recurrent under the continued application of the alternating potentials and is utilized to shunt out through circuit 18 as excessive voltages which may be impressed thereon, for while, the normal impedance between the electrodes 10 and 11 is sufficient to prevent flow of current therebetween under the influence of the voltages of the circuit 18, yet during the short periods after the discharges, the impedance is low enough to permit the shunting out of such voltages as may be harmful in the circuit 18. As above described, the relation of the turns of the transformer is such that the voltages impressed on the secondary 16 by the generator 19 will be stepped down sufficiently before reaching the circuit 18 that they will not be injurious thereto.

There may be provided within the vessel 12 a supply of photo-electric material, such as sodium or potassium to provide an easily ionizable vapor so that the device may be used in connection with comparatively low voltages.

There may be provided instead of an alkali metal vapor, an atmosphere of helium vapor or an atmosphere of helium vapor mixed with alkali metal vapor, the purpose of these vapors being merely to provide a readily ionized atmosphere.

It is, of course, understood that various modifications may be made from the above description without in any way departing from the spirit of the invention as set forth in the appended claims.

What is claimed is:

1. A protective device comprising an enclosing vessel, a pair of electrodes therein, an alternating current source connected to said electrodes for recurrently decreasing the impedance between them, and connections from said electrodes to a circuit to be protected, said source being distinct from the main current source.

2. A protective device comprising an enclosing vessel containing an ionizable vapor, a pair of electrodes therein, an alternating current source connected to said electrodes for recurrently establishing an electric discharge between them, and means for connecting said electrodes with a circuit to be protected, said source being distinct from the main current source.

3. A protective device comprising an enclosing vessel, a pair of electrodes therein, a supply of vaporizable material within said vessel, means for vaporizing said material, a source of alternating potential connected to said electrodes, and means for connecting said electrodes to a circuit to be protected, said source being distinct from the main current source.

4. A protective device comprising an enclosing vessel, a pair of electrodes therein, a supply of alkali metal in said vessel, means for vaporizing said metal, a source of alternating potential connected to said electrodes, and means for connecting said electrodes to a circuit to be protected, said source being distinct from the main current source.

5. A protective device comprising an enclosing vessel containing potassium, means for vaporizing said potassium, a pair of electrodes in said vessel, a source of alternating potential connected to said electrodes, and means for connecting said electrodes to a circuit to be protected, said source being distinct from the main current source.

6. A protective device comprising an enclosing vessel containing ionizable vapor, a pair of electrodes therein, a circuit therefor, a source of alternating potential connected to said electrodes, a circuit to be protected, and a step-up transformer connecting last named circuit to said electrode circuit.

7. A protective device comprising a vessel containing an alkaline metal, means for vaporizing said metal, a pair of electrodes in said vessel, a circuit therefor, a source of alternating potential connected to said electrodes, a circuit to be protected, and a step-up transformer connecting said last named circuit to said electrode circuit.

In witness whereof, I hereunto subscribe my name this 29th day of October A. D., 1923.

HOMER C. SNOOK.